(12) United States Patent
Alwattari

(10) Patent No.: US 9,512,349 B2
(45) Date of Patent: Dec. 6, 2016

(54) SOLID-SUPPORTED CROSSLINKER FOR TREATMENT OF A SUBTERRANEAN FORMATION

(71) Applicant: Halliburton Energy Services, Inc., Houston, TX (US)

(72) Inventor: Ali Alwattari, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 95 days.

(21) Appl. No.: 13/939,762

(22) Filed: Jul. 11, 2013

(65) Prior Publication Data
US 2015/0013983 A1 Jan. 15, 2015

(51) Int. Cl.
| | |
|---|---|
| E21B 43/16 | (2006.01) |
| E21B 43/267 | (2006.01) |
| C09K 8/62 | (2006.01) |
| C09K 8/03 | (2006.01) |
| C09K 8/42 | (2006.01) |
| C09K 8/536 | (2006.01) |
| C09K 8/68 | (2006.01) |
| C09K 8/70 | (2006.01) |
| C09K 8/72 | (2006.01) |
| C09K 8/80 | (2006.01) |
| C09K 8/88 | (2006.01) |
| C09K 8/90 | (2006.01) |
| C09K 8/92 | (2006.01) |

(52) U.S. Cl.
CPC . *C09K 8/62* (2013.01); *C09K 8/03* (2013.01); *C09K 8/42* (2013.01); *C09K 8/536* (2013.01); *C09K 8/685* (2013.01); *C09K 8/70* (2013.01); *C09K 8/725* (2013.01); *C09K 8/805* (2013.01); *C09K 8/882* (2013.01); *C09K 8/887* (2013.01); *C09K 8/90* (2013.01); *C09K 8/92* (2013.01); *C09K 2208/10* (2013.01)

(58) Field of Classification Search
CPC ......... E21B 43/16; E21B 43/26; E21B 43/267
USPC ........................ 166/305.1, 300, 308.1, 308.5
See application file for complete search history.

(56) References Cited

U.S. PATENT DOCUMENTS

| | | | | |
|---|---|---|---|---|
| 4,732,213 A | * | 3/1988 | Bennett et al. | 166/292 |
| 4,829,100 A | * | 5/1989 | Murphey et al. | 523/131 |
| 5,095,987 A | * | 3/1992 | Weaver et al. | 166/276 |
| 5,253,711 A | * | 10/1993 | Mondshine | 166/300 |
| 5,311,946 A | * | 5/1994 | Harry et al. | 166/278 |
| 5,445,223 A | * | 8/1995 | Nelson et al. | 166/308.5 |
| 5,964,291 A | * | 10/1999 | Bourne | C09K 8/80 166/279 |
| 6,454,003 B1 | | 9/2002 | Chang et al. | |
| 2005/0028976 A1 | | 2/2005 | Nguyen | |
| 2007/0034376 A1 | * | 2/2007 | Harris et al. | 166/300 |
| 2011/0195877 A1 | * | 8/2011 | Adderson | 507/269 |

* cited by examiner

Primary Examiner — Catherine Loikith
Assistant Examiner — Silvana Runyan
(74) Attorney, Agent, or Firm — Schwegman Lundberg & Woessner, P.A.; Craig W. Roddy

(57) ABSTRACT

Solid-supported crosslinkers for treatment of a subterranean formation. A method of treating a subterranean formation includes placing in the subterranean formation a composition that includes a solid-supported crosslinker. The solid-supported crosslinker includes a supporting solid, and a crosslinker supported on the supporting solid.

18 Claims, No Drawings

SOLID-SUPPORTED CROSSLINKER FOR TREATMENT OF A SUBTERRANEAN FORMATION

BACKGROUND OF THE INVENTION

During the drilling, completion, and production phases of wells for petroleum or water extraction, the downhole use of compositions including crosslinked polymers is important for a wide variety of purposes. Hydraulic fracturing is the use of a pressurized fluid to form fractures in a subterranean material through which petroleum materials can flow to the wellbore. The high viscosity of compositions including crosslinked polymers can be useful for forming and holding open fractures, and can also force suspended proppant deep into fractures. Crosslinked polymers and compositions including the same can also be useful as packer fluids inserted in the annulus between the tubing and casing above a packer to lower pressure differential across the packer and on the wellbore and casing, can be used as a barrier pill to help manage pressure generated downhole, and can be useful as lost circulation materials to mitigate the loss of drilling fluids to formations downhole.

Past techniques to generate crosslinked polymers include mixing a crosslinkable polymer with a crosslinker above the surface to form the crosslinked polymer, and pumping of a composition including the crosslinked polymer to a desired location downhole. Pumping of high viscosity fluids can be energy intensive and difficult. Pumping compositions including highly crosslinked polymers with very high viscosity to a desired downhole location can be difficult or impossible.

SUMMARY OF THE INVENTION

In various embodiments, the present invention provides a method of treating a subterranean formation. The method includes obtaining or providing a composition. The composition includes a solid-supported crosslinker. The solid-supported crosslinker includes a supporting solid. The solid-supported crosslinker also includes a crosslinker supported on the supporting solid. The method also includes contacting a subterranean material downhole with the composition.

In various embodiments, the present invention provides certain advantages over other methods and compositions for treating a subterranean formation, at least some of which are unexpected. Various embodiments can reduce the cost, complexity, or quantity (footprint) of processing equipment for suspension and delivery of hydraulic fracturing forces and materials at the drilling site. In some examples, the solid-supported crosslinker can increase the performance, effectiveness and, quality (homogeneity or stability) of solids or colloids in fracturing fluids, and can also be useful in cementing and drilling formulations. For example, in various embodiments, the solid-supported crosslinker of the present invention can provide a crosslinked polymer at a desired downhole location that can be pumped from the surface to the downhole location at lower viscosity than the viscosity at the desired downhole location. In some embodiments, the present invention can provide a high degree of control over the degree of crosslinking of the composition at the desired downhole location and the related viscosity thereof, while modulating the reactivity of the crosslinker and correspondingly maintaining an efficiently low viscosity during at least part of the transportation of the composition from above the surface to the desired downhole location. The lower viscosity during at least part of the transport from the surface to the desired downhole location in various embodiments can provide a crosslinked polymer downhole more efficiently and using less energy and time than other compositions and methods. In various examples, the composition can have lower transportation and pumping costs traditionally associated with low viscosity fracturing fluids while providing the majority of benefits traditionally associated with high viscosity fracturing fluids.

In various embodiments, the support for the supported crosslinker can advantageously include a proppant. In some embodiments, the proppant-supported crosslinker can both crosslink polymers in a surrounding solution at the desired downhole location, such as in and around a fracture, and act as a proppant. In addition, in various embodiments, the present invention can provide a higher viscosity composition at a desired downhole location than is economically practical to pump from the surface to the desired downhole location, which can provide deeper fractures and better penetration of proppants into the fractures than other methods and compositions for fracturing. In some embodiments, the addition of unsupported crosslinkers to the composition including solid-supported crosslinkers can provide a composition that can be used to create a fracture magnitude and geometry not currently achievable with existing fracturing fluid formulations and methods. By enabling production of deeper fractures and a higher degree of penetration of proppants into a subterranean fracture, various embodiments can enable more efficient production of material from a production zone than is economically feasible with other compositions and methods for fracturing.

In various embodiments, the composition including the solid-supported crosslinker can be used to perform fracturing with greater control over the type and depth of fractures formed and with more consistent sustaining of formed cracks and channels than other fracturing techniques, such as those that employ expanding materials or other energy sources. In some embodiments, supporting the crosslinker on a solid support can isolate the crosslinker from or reduce the interaction of the crosslinker with other ingredients in the composition until the desired downhole location is reached, allowing for the use of a greater variety of other ingredients and a broader variety of crosslinker compounds and crosslinkable polymers. In embodiments wherein the solid-supported crosslinker is more isolated from other ingredients in the composition than a non-supported crosslinker, the composition can be more forgiving if an error is made in the proportion of ingredients mixed or there is a shortage of an ingredient, and can allow an operator time to correct the error or shortage before irreversible crosslinking of a crosslinkable polymer occurs and valuable materials are wasted.

Various embodiments can provide crosslinking between a greater variety of polymers than corresponding unsupported crosslinkers. Certain embodiments of the solid-supported crosslinker can crosslink a polymer under reaction conditions in which an unsupported crosslinker would normally degrade, or using crosslinkers which would normally experience reduced activity once reacted with a reactive site on the polymer. In some embodiments, the solid support of the solid-supported crosslinker can protect the crosslinker from degradation under the reaction conditions or from experiencing reduced reactivity after reacting with an active site on a polymer, which can allow the crosslinker to go on to crosslink with reactive sites on the same or other polymers. Since different polymers sometimes require different reaction conditions for crosslinking, the protective effect of the support of various embodiments of the solid-supported crosslinker can enable the use of the crosslinker under a greater variety of conditions which can result in an ability to crosslink a greater variety of polymers than possible with most unsupported crosslinkers. In some embodiments, greater versatility in reaction conditions and in the type of individual or multiple polymers that can be effectively crosslinked can provide significant technical, performance, and economic improvements. Various embodiments can allow robust and reliable crosslinking for a more consistent and potentially reduced cost, since the ability to effectively crosslink one or more polymers can be less dependent on which polymers are currently available or on which polymers are currently priced appropriately or are the least expensive. In various embodiments, the protective effect of the solid support can at least partially insulate costs of crosslinking from variation in shipping costs of polymers, commodity prices of polymers, and the like.

In various embodiments, the present invention provides a method of treating a subterranean formation. The method includes obtaining or providing a composition. The composition includes a solid-supported crosslinker. The solid-supported crosslinker includes a supporting solid including a proppant. The solid-supported crosslinker includes a crosslinker supported on the supporting solid, the crosslinker including at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate. The composition also includes a crosslinkable polymer including at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. The method includes contacting a subterranean material downhole with the composition. The method also includes crosslinking the crosslinkable polymer with the crosslinker.

In various embodiments, the present invention provides a system. The system includes a composition including a solid-supported crosslinker. The solid-supported crosslinker includes a supporting solid. The solid-supported crosslinker also includes a crosslinker supported on the supporting solid. The system also includes a subterranean material downhole in contact with the composition.

In various embodiments, the present invention provides a composition for treatment of a subterranean formation. The composition includes a solid-supported crosslinker. The solid-supported crosslinker includes a supporting solid. The solid-supported crosslinker also includes a crosslinker supported on the supporting solid. The composition also includes a crosslinkable polymer.

In various embodiments, the present invention provides a composition for treatment of a subterranean formation. The composition includes a solid-supported crosslinker. The solid-supported crosslinker includes a supporting solid including a proppant. The solid-supported crosslinker also includes a crosslinker supported on the supporting solid, the crosslinker including at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate. The composition also includes a crosslinkable polymer including at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

In various embodiments, the present invention provides a method of preparing a composition for treatment of a subterranean formation. The method includes forming a composition. The composition includes a solid-supported crosslinker. The solid-supported crosslinker includes a supporting solid. The solid-supported crosslinker also includes a crosslinker supported on the supporting solid.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material can be any below-ground area that can produce liquid or gaseous petroleum materials, water, or any section below-ground in fluid contact therewith.

Method of Treating a Subterranean Formation.

In various embodiments, the present invention provides a method of treating a subterranean formation. The method can include obtaining or providing a composition including a solid-supported crosslinker. The method can also include contacting a subterranean material downhole with the composition. In some embodiments, the obtaining or providing of the composition can occur above the surface. In other embodiments, the obtaining or providing of the composition can occur additionally or alternatively downhole.

In some embodiments, the method can be a method of hydraulic fracturing, and the composition can optionally include a proppant; in some embodiments, the solid support can be a proppant. The contacting of the composition and the subterranean material can include fracturing at least part of the subterranean material to form at least one subterranean fracture. The contacted subterranean material can be at least one of a fracture and at least a part of an area surrounding a fracture.

The viscosity of the composition before and after crosslinking can be any suitable viscosity. For example, before crosslinking the composition can have a viscosity of about 0.01 cP to 250,000 cP or more, 1 cP to about 100,000 cP, or about 10 cP to about 1,000 cP, or about 0.01 cP or less, or about 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, or about 250,000 cP or more. For example, after crosslinking the composition can have a viscosity of about 0.01 cP to 500,000,000 cP or more (e.g., the composition can be a gel having essentially infinite viscosity), 1 cP to about 100,000,000, or about 10 cP to about 1,000,000, or about 0.01 cP or less, or about 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, 500,000 cP, 1,000,000 cP, 10,000,000 cP, 100,000,000 cP, or about 500,000,000 cP or more.

The solid-supported crosslinker can be any suitable solid-supported crosslinker that can be used as described herein. The solid-supported crosslinker can include a supporting solid and a crosslinker supported on the supporting solid. The solid-supported crosslinker can be any suitable shape, such as approximately spherical or irregular. The solid-supported crosslinker can be at least one of crystalline, amorphous, and non-crystalline. The solid-supported crosslinker can have any suitable particle size. For example, the solid-supported crosslinker can have a particle size of about 0.01 nm to about 50 mm, or about 0.1 mm to about 20 mm, or about 0.01 nm or less, or about 0.1 nm, 1 nm, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, 5 mm, 10 mm, 20 mm, 30 mm, 40 mm, or about 50 mm or more. In some embodiments, the solid-supported crosslinker is a nanoparticle having a particle size of about 0.01 nm to about 1000 nm or about 2 nm to about 100 nm, or about 0.01 nm or less, or about 0.5 nm, 0.1, 1, 2, 3, 4, 5, 10, 15, 20, 25, 30, 35, 40, 45, 50, 55, 60, 65, 70, 75, 80, 85, 90, 95, 100, 125, 150, 175, 200, 300, 400, 500, 600, 700, 800, 900 nm, or about 1000 nm or more. A particle size of a spherical particle corresponds to the approximate diameter of the sphere. A non-spherical particle size corresponds to the largest dimension of the particle.

The solid-supported crosslinker can have any suitable surface area. In some examples, the solid-supported crosslinker can have a surface area of about 0.01 $m^2/g$ to about 7,500 $m^2/g$, or about 10 $m^2/g$ to about 200 $m^2/g$, or about 0.01 $m^2/g$ or less, or about 0.1 $m^2/g$, 0.5, 1, 2, 3, 4, 5, 10, 15, 20, 25, 50, 75, 100, 125, 150, 175, 200, 250, 300, 350, 400, 500, 1,000, 1,500, 2,000, 3,000, 4,000, 5,000, 6,000 $m^2/g$, or about 7,500 $m^2/g$ or more.

Supporting Solid.

The solid-supported crosslinker can include a supporting solid, on which the crosslinker is supported. The supporting solid can be any suitable solid that can support the crosslinker. In various embodiments, the supporting solid can include a proppant, such as any suitable proppant for holding open subterranean fractures. In some embodiments, the supporting solid does not include a proppant.

Suitable proppants can include any solid-support material disclosed herein which is suitable for holding open a subterranean fracture. The supporting solid can be any suitable shape, such as spherical, non-spherical, or irregular. In some examples, the proppant can be sand, bauxite, ceramic materials, glass materials, polymer materials, tetrafluoroethylene materials (e.g., "TEFLON™," and available from DuPont), nut shell materials, seed shell materials, fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some examples, the particulate material used can have a particle size in the range of from about 2 to about 400 mesh, U.S. Sieve Series. In some examples, the particulate material is graded sand having a particle size in the range of from about 10 to about 70 mesh, U.S. Sieve Series. In some examples, sand particle size distribution ranges are one or more of 10-20 mesh, 20-40 mesh, 40-60 mesh or 50-70 mesh, depending on the particle size and distribution of the formation particulates to be screened out by the particulate materials. The term "particulate," as used herein, includes all known shapes of materials including substantially spherical materials, fibrous materials, polygonal materials (such as cubic materials) and mixtures thereof. A proppant can have any suitable shape such as substantially spherical materials, fibrous materials, polygonal materials (such as cubic materials) and mixtures thereof.

The supporting solid can be at least one of crystalline, amorphous, and non-crystalline. The supporting solid can be a mineral, such as bauxite, sand, carbonate, other hard compounds, or can be a non-mineral. The supporting solid can be a porous or nonporous ceramic, glass beads, a solidified resin. The supporting solid can be a recycled particle or powder, and can be a polymeric or nonpolymeric material. The supporting solid can include at least one of sand, gravel, clay, silica, an inorganic material, and an organic polymer. The supporting solid can include at least one of sand, bauxite, ceramic materials, glass materials, polymer materials, tetrafluoroethylene materials, nut shell materials, seed shell materials, fruit pit materials, wood, processed wood, hollow glass microspheres, solid glass, silica, alumina, magnesium oxide, fumed silica, carbon black, graphite, mica, titanium dioxide, meta-silicate, calcium silicate, kaolin, talc, zirconia, boron, borates, fly ash, and composite particulates prepared from a binder and any supporting solid material described herein. The supporting solid can include at least one of cellulose, starch, polyacrylamide, a salt, a fiber, a resin, Portland cement, pozzolana cement, gypsum cement, high alumina content cement, slag cement, silica cement fly ash, metakaolin, shale, zeolite, a crystalline silica compound, amorphous silica, a hydratable clay, microspheres, pozzolan lime, or a combination thereof. In some embodiments, the supporting solid can include a surfactant incorporated into the pores or coating the surface.

The solid-supported crosslinker can include any suitable amount of the supporting solid. For example, the solid-supported crosslinker can include about 0.000,1 wt % to about 99.999,9 wt % supporting solid, or about 50 wt % to about 99.9 wt % supporting solid, or about 0.000,1 wt % or less of the supporting solid, or about 0.001 wt %, 0.01, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99, 99.999, or about 99.999,9 wt % or more of the supporting solid.

The supporting solid can have any suitable particle size. For example, the supporting solid can have a particle size of about 0.01 nm to about 50 mm, or about 0.1 mm to about 20 mm, or about 0.01 nm or less, or about 0.1 nm, 1 nm, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, 5 mm, 10 mm, 20 mm, 30 mm, 40 mm, or about 50 mm or more. In some embodiments, the supporting solid is a nanoparticle having a particle size of about 0.01 nm to about 1000 nm or about 2 nm to about 100 nm, or about 0.01 nm or less, or about 0.5 nm, 0.1, 1, 2, 3, 4, 5, 10, 15, 20, 25, 30, 35, 40, 45, 50, 55, 60, 65, 70, 75, 80, 85, 90, 95, 100, 125, 150, 175, 200, 300, 400, 500, 600, 700, 800, 900 nm, or about 1000 nm or more. A particle size of a spherical particle corresponds to the approximate diameter of the sphere. A non-spherical particle size corresponds to the largest dimension of the particle.

The supporting solid can have any suitable surface area. In some examples, the supporting solid can have a surface area of about 0.01 m$^2$/g to about 7,500 m$^2$/g, or about 10 m$^2$/g to about 200 m$^2$/g, or about 0.01 m$^2$/g or less, or about 0.1 m$^2$/g, 0.5, 1, 2, 3, 4, 5, 10, 15, 20, 25, 50, 75, 100, 125, 150, 175, 200, 250, 300, 350, 400, 500, 1,000, 1,500, 2,000, 3,000, 4,000, 5,000, 6,000 m$^2$/g, or about 7,500 m$^2$/g or more.

The supporting solid can have any suitable porosity, and can be porous or substantially nonporous. In some embodiments, the supporting solid can be a porous supporting solid having a pore size of about 0.01 nm to about 5 mm, or about 1 nm to about 1 mm, or about 0.1 nm, 1 nm, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, or about 1 mm or more. Porous supporting solid can have any suitable pore volume. For example, the supporting solid can have a specific pore volume of about 0.01 cm$^3$/g to about 40 cm$^3$/g, or about 0.1 cm$^3$/g to about 20 cm$^3$/g, or about 0.01 cm$^3$/g or less, or about 0.05 cm$^3$/g, 0.1, 0.5, 1, 2, 3, 4, 5, 10, 15, 20, 25, 30, 35 cm$^3$/g, or about 40 cm$^3$/g or more.

In various embodiments, the supporting solid is formed. The supporting solid can be formed using any suitable technique. In some embodiments, the supporting solid can be formed using a sol-gel technique. The sol-gel technique can be any suitable sol-gel technique that creates a supporting solid or a solid-supporting crosslinker that can be used as described herein. The technique can include forming a sol (e.g. a colloidal solution), and then gelling the sol to generate a gel. In some examples, the crosslinker is added to the supporting solid after the sol has been gelled. In other examples, the crosslinker is added to the sol and the sol is gelled, to form a gel with crosslinker interspersed therein. In some examples, the sol can be gelled with crosslinker therein, and crosslinker can also be added to the resulting gel. In other embodiments, a sol gelled with a crosslinker therein receives no additional crosslinker. Sol-gel techniques can be used to generate any suitable material for the supporting solid, for example, alumina, silica, borates, or magnesium oxide. A sol-gel technique can be carried out on-site proximate the wellbore, or off-site. In some examples, the sol-gel technique forms In some examples, the sol-gel technique forms self-assembled particles. In some examples, the sol can form a stable suspension of particles that self-assemble to give a highly ordered microstructure that can be used as the supporting solid.

Crosslinker Supported on the Supporting Solid.

The solid-supported crosslinker includes a crosslinker supported on the supporting solid. The crosslinker can be any suitable crosslinker that can crosslink a crosslinkable polymer at least one of while supported by the supporting solid and when not supported by the supporting solid. The crosslinker supported on the supporting solid can be any suitable shape. The crosslinking supported on the supporting solid can be at least one of crystalline, amorphous, and non-crystalline.

The supporting solid can support the crosslinker in any suitable manner, such that the solid-supported crosslinker can be used as described herein. For example, the crosslinker supported on the supporting solid can be coated, infused, or impregnated onto the supporting solid. For example, the supporting solid can and the crosslinker can be connected via at least one of a covalent bond, an ionic bond, Van der Waals force, London dispersion force, dipole-dipole interaction, hydrogen bonding, metallic bond, cation-pi interaction, and physical intertwinement. In some examples, wherein the connection between the supporting solid and the crosslinker supported on the supporting solid includes physical intertwinement, the crosslinker supported on the supporting solid can be at least partially disposed within pores of the supporting solid.

In some examples, the crosslinker supported by the solid support has a different rate of reaction with crosslinkable polymer in the ambient medium than a corresponding crosslinker that is not supported on the solid support; the different reactivity of the crosslinker supported on the supporting solid can be greater reactivity, lower reactivity, or reactivity dependent on the ambient environment. In some embodiments, the solid-supported crosslinker has a modulated reactivity of the crosslinker supported on the supporting solid to delay or reduce the crosslinking action of the crosslinker on crosslinkable polymers in the ambient medium until the solid-supported crosslinker reaches a desired downhole location, wherein the crosslinker supported on the supporting solid is then crosslinks materials in a surrounding solution, such as crosslinkable polymers. The desired downhole location can be any suitable downhole location in which the solid-supported crosslinker contacts the subterranean material.

In some embodiments, the supporting solid and the crosslinker supported on the supporting solid can be connected sufficiently such that the crosslinker is less available to a surrounding medium for crosslinking than a crosslinker not supported on the supporting solid, such that the crosslinker supported on the supporting solid at surface conditions crosslinks crosslinkable polymers in a surrounding medium at a lower rate than a corresponding crosslinker not supported by the supporting solid. In other embodiments, a solid-supported crosslinker can have similar or greater activity than a corresponding crosslinker not supported on the supporting solid, for example due to increased surface area caused by a solid support having large surface area, caused by nanocrystalline crystals of the crosslinker which can have greater surface area than other forms of the crosslinker, or a combination thereof. In some embodiments, under surface conditions a crosslinker supported on the supporting solid crosslinks crosslinkable polymers in the surrounding medium at a lower rate than a corresponding crosslinker not supported by the supporting solid under the same conditions, but at downhole conditions at or near the contacted subterranean material crosslinks crosslinkable polymers in the surrounding medium at an approximately equal or greater rate than a corresponding crosslinker not supported by the supporting solid under the same conditions. In some embodiments, under surface conditions a crosslinker supported on the supporting solid crosslinks crosslinkable polymers in the surrounding medium at a lower rate than a corresponding crosslinker supported by a solid support under downhole conditions, but at a lower or higher rate than a corresponding crosslinker not supported by the supporting solid under the same downhole conditions.

In some embodiments, the crosslinker supported by the supporting solid can be in an active form while supported by the supporting solid. In other embodiments, the crosslinker supported by the supporting solid can be in an inactive form or a form having reduced reactivity while supported. Crosslinkers having reduced reactivity while supported can be transformed to an active form when exposed to downhole conditions, such as near a subterranean fracture. In some embodiments, transformation to an active form can include a chemical transformation, or can include dissolution due to downhole temperatures or other downhole conditions such as agitation or pressure.

In various embodiments, the crosslinker supported on the supporting solid includes at least one of chromium, aluminum, antimony, zirconium, titanium, calcium, boron, iron, silicon, copper, zinc, and magnesium. The crosslinker supported on the supporting solid can be at least one of boric acid, borax, ferric chloride, disodium octaborate tetrahydrate, sodium diborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

The solid-supported crosslinker can include any suitable amount of crosslinker supported on the supporting solid. For example, the solid-supported crosslinker can include about 0.000,1 wt % to about 99.999,9 wt % crosslinker supported on the supporting solid, or about 0.01 wt % to about 50 wt % crosslinker supported on the supporting solid, or about 0.001 wt %, 0.01, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99, 99.999, or about 99.999,9 wt % or more of the supporting solid.

In some embodiments, the crosslinker supported on the supporting solid can be crystalline. In some examples, the crystals of the crosslinker supported on the supporting solid can have an average particle size of 0.001 nm to about 5 mm, or about 1 nm to about 1 mm, or about 0.001 nm or less, or about 0.005 nm, 0.01 nm, 0.05 nm, 0.1 nm, 0.5 nm, 1 nm, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, or about 5 mm or more. A particle size of a spherical particle corresponds to the approximate diameter of the sphere. A non-spherical particle size corresponds to the largest dimension of the particle.

In some embodiments, the crosslinker supported on the supporting solid includes a coating of crosslinker on at least part of the surface of the supporting solid. The coating can cover any suitable amount of the solid support, such as substantially the entire solid support, or can coat any suitable fraction of the entirety of the surface area of the particle, including any pores on the solid support, such as about 1%, 5%, 20%, 50%, 80%, 90%, 95%, 99%, or about 100% of the surface area of the solid support. The coating can have any suitable thickness, such as about 0.1 nm-10 mm, or about 1 nm to about 1 mm, or about 1 nm or less, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, or about 1 mm or more. In some embodiments the crosslinker can be a coating of zirconium nanocrystals, for example which can cause crosslinking of dissolved ambient polymers in some embodiments in a short contact time, such as within 15 to 30 seconds.

In some embodiments, in addition to the crosslinker supported on the supporting solid, the composition can also include any suitable crosslinker described herein. In some examples, the combination of a crosslinker supported on a supporting solid and a nonsupported crosslinker, which can be the same or different, can provide a desired viscosity during transport to a downhole location (e.g., to suspend particles such as proppants or solid-supported crosslinkers) in combination with a desired increase in viscosity once the composition reaches the downhole location. A combination of solid-supported crosslinker and a nonsupported crosslinker can achieve a desired amount of speed and quantity of crosslinking, and can be adjusted to attain a particular amount and type of fracturing downhole. In some embodiments, the addition of unsupported crosslinkers to the composition can create a fracture magnitude and geometry not currently achievable with existing fracturing fluid formulations and methods.

Crosslinkable Polymer.

The crosslinkable polymer can be any suitable polymer that can be crosslinked by the crosslinker. In some embodiments, the crosslinkable polymer can be a linear polysaccharide. The crosslinkable polymer can be at least one of poly(acrylic acid) or esters thereof, poly(vinyl acetate), poly(vinyl alcohol), poly(ethylene glycol), poly(vinyl pyrrolidone), polyacrylamide, poly (hydroxyethyl methacrylate), cellulose, starch, tamarind, tragacanth, guar gum, gum ghatti, gum arabic, locust bean gum, and cellulose or a derivative thereof. In some embodiments, the crosslinkable polymer can be at least one of acetan, alginate, cellulose, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan. The crosslinkable polymer can be at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

In some embodiments, the method includes crosslinking the crosslinkable polymer to give a crosslinked polymer. The crosslinking can occur downhole. In some embodiments, the crosslinking can occur above the surface, or a combination of above the surface and downhole. In some embodiments, a small proportion of crosslinking occurs at the surface and en route to a desired location downhole, and the majority of crosslinking occurs at the downhole location. The crosslinking can occur before the contacting of the composition and the subterranean material, during the contacting of the composition and the subterranean material, after the contacting of the composition and the subterranean material, or a combination thereof.

The crosslinking can be any suitable crosslinking. For example, the crosslinking can be a chemical reaction between the crosslinker supported on the supporting solid and the crosslinkable polymer, such that the crosslinkable polymer forms intramolecular bonds, intermolecular bonds, or a combination thereof, and thereby increases in viscosity.

The bonds forming during the crosslinking can be covalent bonds, ionic bonds, hydrogen bonds, Van der Waals interactions, or other interactions that increase the viscosity of the crosslinkable polymer.

In some embodiments, the method can include separating the supporting solid and the crosslinker supported on the supporting solid to give an unsupported crosslinker. In some examples, at least part of the crosslinking can include a chemical reaction between the crosslinkable polymer and the unsupported crosslinker. The separating can occur at least partially in response to at least one of heat, low pH, high pH, radiation, chemical reaction, natural decay, vibration, acoustic energy, and agitation, any one or more of which can be downhole conditions at or near the location where an increase in viscosity is desired. The unsupported crosslinker can be in any suitable form, such as a solid or dissolved in a surrounding solution.

The method can include triggering the crosslinking at a location, such as a downhole location, where crosslinking and corresponding increase in viscosity is desired. The triggering can occur at any suitable time, such as at least one of during and after the contacting of the composition with the subterranean formation. The triggering can occur by any suitable means, such as heat-triggering, acid-triggering, caustic material-triggering, radiation-triggering, chemically-triggering, natural decay-triggering, vibration-triggering, acoustic-triggering, agitation-triggering, or a combination thereof. In some examples, heat-triggering can include exposing to downhole conditions proximate to the contacted subterranean formation.

The solid-supported crosslinker can include a degradable coating that at least partially or substantially fully coats an outer surface of the solid-supported crosslinker. In some examples, the degradable coating degrades in response to preselected downhole conditions, such as at least partially in response to at least one of heat, low pH, high pH, radiation, chemical reaction, natural decay, vibration, acoustic energy, agitation. The coating can cover any suitable amount of the solid-supported crosslinker, such as substantially the entire solid-supported crosslinker, or can coat any suitable fraction of the entirety of the surface area of the solid-supported crosslinker, including pores, such as about 1%, 5%, 20%, 50%, 80%, 90%, 95%, 99%, or about 100% of the surface area of the solid-supported crosslinker. The coating can have any suitable thickness, such as about 0.1 nm to about 10 mm, or about 1 nm to about 1 mm, or about 1 nm or less, 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, or about 1 mm or more.

Downhole Mixture or Composition.

The composition including the solid-supported crosslinker can be combined with any suitable downhole fluid before, during, or after the contacting of the composition and the subterranean material. In some examples, the solid-supported crosslinker is combined with a downhole fluid above the surface, then the combined composition is placed downhole and contacted with a subterranean material. In another example, the solid-supported crosslinker is injected downhole to combine with a downhole fluid, and the combined composition is contacted with a subterranean material. In various examples, at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof In various embodiments, the method includes combining the composition including the solid-supported crosslinker with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture. The contacting of the subterranean material and the composition can include contacting the subterranean material and the mixture. A mixture that is contacted with the subterranean material can include any suitable weight percent of the composition including the solid-supported crosslinker or of the solid-supported crosslinker, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition including the solid-supporting crosslinker o of the solid-supported crosslinker.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g. xanthan gum). Any ingredient listed in this paragraph can be either present or not present in the mixture. The drilling fluid can be present in the mixture with the composition including the solid-supported crosslinker in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5$^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including a solid-supported crosslinker can form a useful combination with cement or cement kiln dust. The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid.

The composition can include a payload material. The payload can be deposited in any suitable downhole location. The method can include using the composition to deposit a payload material into a subterranean fracture. The subterranean fracture can be any suitable subterranean fraction. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitious kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

System.

In various embodiments, the present invention provides a system. The system can include a composition including the solid-supported crosslinker described herein, including a supporting solid and a crosslinker supported on the supporting solid. The system can also include a subterranean material downhole in contact with the composition. In some embodiments, the composition in the system can also include a crosslinkable polymer configured to react with the crosslinker supported on the supporting solid to generate a crosslinked polymer.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can include the solid-supported crosslinker described herein, including a supporting solid and a crosslinker supported on the supporting solid. In some embodiments, the composition includes a crosslinkable polymer that can be crosslinked by the crosslinker supported on the supporting solid.

In some embodiments, the composition further includes a downhole fluid. The downhole fluid can be any suitable downhole fluid. In some embodiments, the downhole fluid is a composition for fracturing of a subterranean material. The composition can be a composition for hydraulic fracturing.

In some embodiments the supporting solid includes a proppant. In some embodiments the crosslinker supported on the support solid includes at least one of a crosslinker supported on the supporting solid, the crosslinker including at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate. In some embodiments, the crosslinkable polymer includes at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a solid-supported crosslinker as described herein, including a supporting solid and a crosslinker supported on the supporting solid. The composition formed can also include a crosslinkable polymer. In some embodiments, the solid-supported crosslinker is provided or obtained and mixed together with the crosslinkable polymer and one or more optional ingredients.

In some embodiments, the method for preparing the composition includes applying the crosslinker to the supporting solid. The method for preparing the composition includes applying a crosslinker precursor to the supporting solid. The application can occur via any suitable method, such as via coating, spraying, immersing, brushing, dipping, dry blending (optionally including a surfactant), and the like. In some embodiments, forming the composition includes coating, infusing, chemically forming, or impregnating the crosslinker on the supporting solid. In some examples, forming the composition includes forming the supporting solid using a sol-gel method in a solution while the crosslinker is in the solution.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising obtaining or providing a composition comprising a solid-supported crosslinker comprising a supporting solid; and a crosslinker supported on the supporting solid; and contacting a subterranean material downhole with the composition.

Embodiment 2 provides the method of Embodiment 1, wherein the method comprises a method of hydraulic fracturing.

Embodiment 3 provides the method of any one of Embodiments 1-2, wherein the contacting of the composition and the subterranean material comprises fracturing at least part of the subterranean material to form at least one subterranean fracture.

Embodiment 4 provides the method of any one of Embodiments 1-3, wherein the contacted subterranean material is at least one of a fracture and at least a part of an area surrounding a fracture.

Embodiment 5 provides the method of any one of Embodiments 1-4, wherein the obtaining or providing of the composition occurs above the surface.

Embodiment 6 provides the method of any one of Embodiments 1-5, wherein the obtaining or providing of the composition occurs downhole.

Embodiment 7 provides the method of any one of Embodiments 1-6, wherein the composition further comprises a crosslinkable polymer.

Embodiment 8 provides the method of Embodiment 7, wherein the crosslinkable polymer comprises a linear polysaccharide.

Embodiment 9 provides the method of any one of Embodiments 7-8, wherein the crosslinkable polymer comprises at least one of poly(acrylic acid) or esters thereof, poly(vinyl acetate), poly(vinyl alcohol), poly(ethylene glycol), poly(vinyl pyrrolidone), polyacrylamide, poly (hydroxyethyl methacrylate), cellulose, starch, tamarind, tragacanth, guar gum, gum ghatti, gum arabic, locust bean gum, and cellulose or a cellulose derivative.

Embodiment 10 provides the method of any one of Embodiments 7-9, wherein the crosslinkable polymer comprises at least one of acetan, alginate, cellulose, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan.

Embodiment 11 provides the method of any one of Embodiments 7-10, wherein the crosslinkable polymer comprises at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 12 provides the method of any one of Embodiments 7-11, wherein the method further comprises crosslinking the crosslinkable polymer to give a crosslinked polymer.

Embodiment 13 provides the method of Embodiment 12, wherein the crosslinking occurs above the surface.

Embodiment 14 provides the method of any one of Embodiments 12-13, wherein the crosslinking occurs downhole.

Embodiment 15 provides the method of any one of Embodiments 12-14, wherein the crosslinking occurs before the contacting of the composition and the subterranean material.

Embodiment 16 provides the method of any one of Embodiments 12-15, wherein the crosslinking occurs at least one of during and after the contacting of the composition and the subterranean material.

Embodiment 17 provides the method of any one of Embodiments 12-16, wherein at least part of the crosslinking comprises a chemical reaction between the crosslinker supported on the supporting solid and the crosslinkable polymer.

Embodiment 18 provides the method of any one of Embodiments 12-17, wherein the method further comprises separating the supporting solid and the crosslinker supported on the supporting solid to give an unsupported crosslinker.

Embodiment 19 provides the method of Embodiment 18, wherein at least part of the crosslinking comprises a chemical reaction between the crosslinkable polymer and the unsupported crosslinker.

Embodiment 20 provides the method of any one of Embodiments 18-19 wherein the separating occurs at least partially in response to at least one of heat, low pH, high pH, radiation, chemical reaction, natural decay, vibration, acoustic energy, and agitation.

Embodiment 21 provides the method of any one of Embodiments 18-20, wherein the unsupported crosslinker is at least one of a solid and dissolved in a surrounding solution.

Embodiment 22 provides the method of any one of Embodiments 12-21, further comprising triggering the crosslinking.

Embodiment 23 provides the method of Embodiment 22, wherein the triggering occurs downhole.

Embodiment 24 provides the method of any one of Embodiments 22-23, wherein the triggering occurs at least one of during and after the contacting of the composition with the subterranean formation.

Embodiment 25 provides the method of any one of Embodiments 22-24, wherein the triggering comprises heat-triggering, acid-triggering, caustic material-triggering, radiation-triggering, chemically-triggering, natural decay-triggering, vibration-triggering, acoustic-triggering, agitation-triggering, or a combination thereof.

Embodiment 26 provides the method of Embodiment 25, wherein the heat-triggering comprises exposing to downhole conditions proximate to the contacted subterranean formation.

Embodiment 27 provides the method of any one of Embodiments 1-26, wherein the supporting solid comprises at least one of sand, gravel, clay, silica, an inorganic material, and an organic polymer.

Embodiment 28 provides the method of any one of Embodiments 1-27, wherein the supporting solid comprises at least one of sand, bauxite, ceramic materials, glass materials, polymer materials, tetrafluoroethylene materials, nut shell materials, seed shell materials, fruit pit materials, wood, processed wood, hollow glass microspheres, solid glass, and composite particulates prepared from a binder and at least one of silica, alumina, fumed silica, carbon black, graphite, mica, titanium dioxide, meta-silicate, calcium silicate, kaolin, talc, zirconia, boron, and fly ash.

Embodiment 29 provides the method of any one of Embodiments 1-28, wherein the supporting solid comprises at least one of cellulose, starch, polyacrylamide, a salt, a fiber, a resin, Portland cement, pozzolana cement, gypsum cement, high alumina content cement, slag cement, silica cement fly ash, metakaolin, shale, zeolite, a crystalline silica compound, amorphous silica, a hydratable clay, microspheres, and pozzolan lime.

Embodiment 30 provides the method of any one of Embodiments 1-29, wherein the supporting solid is formed using a sol-gel technique.

Embodiment 31 provides the method of any one of Embodiments 1-30, wherein the supporting solid comprises a proppant.

Embodiment 32 provides the method of any one of Embodiments 1-31, wherein the supporting solid has a particle size of about 0.01 nm to about 50 mm.

Embodiment 33 provides the method of any one of Embodiments 1-32, wherein the supporting solid has a particle size of about 0.1 mm to about 20 mm.

Embodiment 34 provides the method of any one of Embodiments 1-33, wherein the supporting solid comprises a particle having a particle size of about 0.01 nm to about 1000 nm.

Embodiment 35 provides the method of any one of Embodiments 1-34, wherein the supporting solid comprises a nanoparticle having a particle size of about 2 nm to about 100 nm.

Embodiment 36 provides the method of any one of Embodiments 1-35, wherein the supporting solid has a surface area of about 0.01 $m^2/g$ to about 7,500 $m^2/g$.

Embodiment 37 provides the method of any one of Embodiments 1-36, wherein the supporting solid has a surface area of about 10 $m^2/g$ to about 200 $m^2/g$.

Embodiment 38 provides the method of any one of Embodiments 1-37, wherein the supporting solid is porous or substantially nonporous.

Embodiment 39 provides the method of any one of Embodiments 1-38, wherein the supporting solid comprises a porous supporting solid having a pore size of about 0.01 nm to about 5 mm.

Embodiment 40 provides the method of any one of Embodiments 1-39, wherein the supporting solid comprises a porous supporting solid having a pore size of about 1 nm to about 1 mm.

Embodiment 41 provides the method of any one of Embodiments 1-40, wherein the supporting solid comprises a porous supporting solid having a specific pore volume of about 0.01 cm$^3$/g to about 40 cm$^3$/g.

Embodiment 42 provides the method of any one of Embodiments 1-41, wherein the supporting solid comprises a porous supporting solid having a specific pore volume of about 0.1 cm$^3$/g to about 20 cm$^3$/g.

Embodiment 43 provides the method of any one of Embodiments 1-42, wherein the supporting solid is at least one of crystalline and amorphous.

Embodiment 44 provides the method of any one of Embodiments 1-43, wherein the supporting solid is approximately spherical or irregular.

Embodiment 45 provides the method of any one of Embodiments 1-44, wherein the crosslinker supported on the supporting solid comprises at least one of chromium, aluminum, antimony, zirconium, titanium, calcium, boron, iron, silicon, copper, zinc, and magnesium.

Embodiment 46 provides the method of any one of Embodiments 1-45, wherein the crosslinker supported on the supporting solid comprises at least one of boric acid, borax, ferric chloride, disodium octaborate tetrahydrate, sodium diborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 47 provides the method of any one of Embodiments 1-46, wherein the crosslinker supported on the supporting solid comprises at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate.

Embodiment 48 provides the method of any one of Embodiments 1-47, wherein the solid-supported crosslinker comprises about 0.000,1 wt % to about 99.999,9 wt % crosslinker supported on the supporting solid.

Embodiment 49 provides the method of any one of Embodiments 1-48, wherein the solid-supported crosslinker comprises about 0.01 wt % to about 50 wt % crosslinker supported on the supporting solid.

Embodiment 50 provides the method of any one of Embodiments 1-49, wherein the solid-supported crosslinker comprises about 0.000,1 wt % to about 99.999,9 wt % supporting solid.

Embodiment 51 provides the method of any one of Embodiments 1-50, wherein the solid-supported crosslinker comprises about 50 wt % to about 99.9 wt % supporting solid.

Embodiment 52 provides the method of any one of Embodiments 1-51, wherein the solid-supported crosslinker has a particle size of about 0.01 nm to about 50 mm.

Embodiment 53 provides the method of any one of Embodiments 1-52, wherein the solid-supported crosslinker has a particle size of about 0.1 mm to about 20 mm.

Embodiment 54 provides the method of any one of Embodiments 1-53, wherein the solid-supported crosslinker comprises a nanoparticle having a particle size of about 0.01 nm to about 1000 nm.

Embodiment 55 provides the method of any one of Embodiments 1-54, wherein the solid-supported crosslinker comprises a nanoparticle having a particle size of about 2 nm to about 100 nm.

Embodiment 56 provides the method of any one of Embodiments 1-55, wherein the solid-supported crosslinker has a surface area of about 0.01 m$^2$/g to about 7,500 m$^2$/g.

Embodiment 57 provides the method of any one of Embodiments 1-56, wherein the solid-supported crosslinker has a surface area of about 10 m$^2$/g to about 200 m$^2$/g.

Embodiment 58 provides the method of any one of Embodiments 1-57, wherein the crosslinker supported on the supporting solid is at least one of amorphous and crystalline.

Embodiment 59 provides the method of any one of Embodiments 1-58, wherein the crosslinker supported on the supporting solid comprises crystals.

Embodiment 60 provides the method of Embodiment 59, wherein the crystals of the crosslinker supported on the supporting solid have an average particle size of 0.001 nm to about 5 mm.

Embodiment 61 provides the method of any one of Embodiments 59-60, wherein the crystals of the crosslinker supported on the supporting solid have an average particle size of about 1 nm to about 1 mm.

Embodiment 62 provides the method of any one of Embodiments 1-61, wherein the crosslinker supported on the supporting solid comprises a coating on at least part of a surface of the supporting solid.

Embodiment 63 provides the method of Embodiment 62, wherein the coating of the crosslinker supported on the supporting solid has a thickness of about 0.1 nm to about 10 mm.

Embodiment 64 provides the method of any one of Embodiments 62-63, wherein the coating of the crosslinker supported on the supporting solid has a thickness of about 1 nm to about 1 mm.

Embodiment 65 provides the method of any one of Embodiments 1-64, wherein the supporting solid and the crosslinker supported on the supporting solid are connected by at least one of a covalent bond, an ionic bond, Van der Waals force, London dispersion force, dipole-dipole interaction, hydrogen bonding, metallic bond, cation-pi interaction, and physical intertwinement.

Embodiment 66 provides the method of any one of Embodiments 1-65, wherein the supporting solid and the crosslinker supported on the supporting solid are connected sufficiently such that the crosslinker is less available to a surrounding medium for crosslinking than a crosslinker not supported on the supporting solid.

Embodiment 67 provides the method of any one of Embodiments 1-66, wherein the supporting solid and the crosslinker supported on the supporting solid are connected by at least one of a covalent bond, an ionic bond, and physical intertwinement.

Embodiment 68 provides the method of any one of Embodiments 1-67, wherein at least part of the crosslinker is disposed at least partially within pores of the supporting solid.

Embodiment 69 provides the method of any one of Embodiments 1-68, wherein at least part of the crosslinker comprises crystals disposed at least partially within pores of the supporting solid.

Embodiment 70 provides the method of any one of Embodiments 1-69, wherein the solid-supported crosslinker comprises a degradable coating that at least partially coats an outer surface of the solid-supported crosslinker.

Embodiment 71 provides the method of any one of Embodiments 1-70, wherein the solid-supported crosslinker comprises a degradable coating that substantially fully coats an outer surface of the solid-supported crosslinker.

Embodiment 72 provides the method of any one of Embodiments 1-71, wherein the degradable coating degrades in response to preselected downhole conditions.

Embodiment 73 provides the method of any one of Embodiments 1-72, wherein the degradable coating degrades at least partially in response to at least one of heat, low pH, high pH, radiation, chemical reaction, natural decay, vibration, acoustic energy, agitation.

Embodiment 74 provides the method of any one of Embodiments 1-73, wherein the degradable coating degrades in response to heat.

Embodiment 75 provides the method of any one of Embodiments 1-74, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the contacting of the subterranean material and the composition comprises contacting the subterranean material and the mixture.

Embodiment 76 provides the method of Embodiment 75, wherein the cementing fluid comprises Portland cement, pozzolana cement, gypsum cement, high alumina content cement, slag cement, silica cement, or a combination thereof.

Embodiment 77 provides the method of any one of Embodiments 1-76, wherein at least one of prior to, during, and after the contacting of the subterranean material and the composition, the composition is used downhole, at least one of alone and in combination with other materials comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 78 provides the method of any one of Embodiments 1-77, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 79 provides the method of any one of Embodiments 1-78, wherein the composition further comprises a proppant, a resin-coated proppant, an encapsulated resin, or a combination thereof.

Embodiment 80 provides the method of any one of Embodiments 1-79, wherein the composition comprises a payload material.

Embodiment 81 provides the method of Embodiment 80, further comprising using the composition to deposit at least part of the payload material downhole.

Embodiment 82 provides the method of Embodiment 81, wherein the at least part of the payload material is deposited in a subterranean fracture.

Embodiment 83 provides the method of any one of Embodiments 80-82, wherein the payload material comprises a proppant, a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 84 provides a method of treating a subterranean formation, the method comprising obtaining or providing a composition comprising a solid-supported crosslinker comprising a supporting solid comprising a proppant; and a crosslinker supported on the supporting solid, the crosslinker comprising at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate; and a crosslinkable polymer comprising at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar; contacting a subterranean material downhole with the composition; and crosslinking the crosslinkable polymer with the crosslinker.

Embodiment 85 provides a system comprising a composition comprising a solid-supported crosslinker comprising a supporting solid; and a crosslinker supported on the supporting solid; and a subterranean material downhole in contact with the composition.

Embodiment 86 provides a composition for treatment of a subterranean formation, the composition comprising a solid-supported crosslinker comprising a supporting solid; and a crosslinker supported on the supporting solid; and a crosslinkable polymer.

Embodiment 87 provides the composition of Embodiment 86, wherein the composition further comprises a downhole fluid.

Embodiment 88 provides the composition of any one of Embodiments 86-87, wherein the composition is a composition for fracturing of a subterranean material.

Embodiment 89 provides the composition of any one of Embodiments 86-88, wherein the composition is a composition for hydraulic fracturing.

Embodiment 90 provides a composition for treatment of a subterranean formation, the composition comprising a solid-supported crosslinker comprising a supporting solid comprising a proppant; and a crosslinker supported on the supporting solid, the crosslinker comprising at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate; and a crosslinkable polymer comprising at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 91 provides a method of preparing a composition for treatment of a subterranean formation, the method comprising forming a composition comprising a solid-supported crosslinker comprising a supporting solid; and a crosslinker supported on the supporting solid; and a crosslinkable polymer.

Embodiment 92 provides the method of Embodiment 91, wherein forming the composition comprises applying the crosslinker to the supporting solid.

Embodiment 93 provides the method of any one of Embodiments 91-92, wherein forming the composition comprises applying a crosslinker precursor to the supporting solid.

Embodiment 94 provides the method of any one of Embodiments 91-93, wherein forming the composition comprises coating, infusing, or impregnating the crosslinker on the supporting solid.

Embodiment 95 provides the method of any one of Embodiments 91-94, wherein forming the composition comprises forming the supporting solid using a sol-gel method in a solution while the crosslinker is in the solution.

Embodiment 96 provides the apparatus or method of any one or any combination of Embodiments 1-95 optionally configured such that all elements or options recited are available to use or select from.

What is claimed is:

1. A method of treating a subterranean formation, the method comprising:
    obtaining or providing above the surface of the subterranean formation a composition comprising a solid-supported crosslinker, the solid-supported crosslinker comprising
        a particulate supporting solid that is a sol-gel technique-formed material selected from the group consisting of silica, a borate, magnesium oxide, and a combination thereof, the particulate supporting solid having a particle size of about 0.1 mm to about 20 mm, and
        a crosslinker supported on the particulate supporting solid; and
    placing in the subterranean formation the composition obtained or provided above the surface of the subterranean formation comprising the solid-supported crosslinker;
    wherein the composition further corn s a crosslinkable polymer, and
    wherein the crosslinker supported on the particulate supporting solid has a greater or lower reactivity with the crosslinkable polymer than a corresponding crosslinker that is not supported by the supporting solid.

2. The method of claim 1, wherein the placing of the composition in the subterranean formation comprises fracturing at least part of the subterranean formation to form at least one subterranean fracture.

3. The method of claim 1, wherein the composition is placed in the subterranean formation in at least one of a fracture and at least a part of an area surrounding a fracture.

4. The method of claim 1, wherein the crosslinkable polymer comprises a linear polysaccharide.

5. The method of claim 1, wherein the crosslinkable polymer comprises at least one of poly(acrylic acid) or esters thereof, poly(vinyl acetate), poly(vinyl alcohol), poly(ethylene glycol), poly(vinyl pyrrolidone), polyacrylamide, poly(hydroxyethyl methacrylate), starch, tamarind, tragacanth, gum ghatti, gum arabic, locust bean gum, cellulose, hydroxyethyl cellulose, carboxymethyl hydroxyethyl cellulose, hydroxypropyl cellulose, methyl hydroxyl ethyl cellulose, guar gum, hydroxypropyl guar, carboxy methyl guar, and carboxymethyl hydroxylpropyl guar.

6. The method of claim 1, wherein the method further comprises crosslinking the crosslinkable polymer to give a crosslinked polymer.

7. The method of claim 6, wherein at least part of the crosslinking comprises a chemical reaction between the crosslinker supported on the particulate supporting solid and the crosslinkable polymer.

8. The method of claim 6, wherein the method further comprises separating the particulate supporting solid and the crosslinker supported on the particulate supporting solid to give an unsupported crosslinker, wherein at least part of the crosslinking comprises a chemical reaction between the crosslinkable polymer and the unsupported crosslinker.

9. The method of claim 6, further comprising triggering the crosslinking.

10. The method of claim 1, wherein the particulate supporting solid comprises a proppant.

11. The method of claim 1, wherein the particulate supporting solid comprises at least one of sand, gravel, clay, silica, an inorganic material, and an organic polymer.

12. The method of claim 1, wherein the crosslinker supported on the particulate supporting solid comprises at least one of chromium, aluminum, antimony, zirconium, titanium, calcium, boron, iron, silicon, copper, zinc, and magnesium.

13. The method of claim 1, wherein the crosslinker supported on the particulate supporting solid comprises at least one of boric acid, borax, ferric chloride, disodium octaborate tetrahydrate, sodium diborate, a pentaborate, ulexite, colemanite, magnesium oxide, zirconium lactate, zirconium triethanol amine, zirconium lactate triethanol amine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

14. The method of claim 1, wherein the solid-supported crosslinker has a particle size of about 0.1 mm to about 50 mm.

15. The method of claim 1, wherein the solid-supported crosslinker comprises a degradable coating that at least partially coats an outer surface of the solid-supported crosslinker.

16. The method of claim 1, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the placing of the composition in the subterranean formation comprises placing the mixture in the subterranean formation.

17. A method of treating a subterranean formation, the method comprising:
    obtaining or providing above the surface of the subterranean formation a composition comprising
        a solid-supported crosslinker comprising
            a particulate supporting solid comprising a proppant, wherein the particulate supporting solid is a sol-gel technique-formed material selected from the group consisting of silica, a borate, and magnesium oxide, the particulate supporting solid having a particle size of about 0.1 mm to about 20 mm; and
            a crosslinker supported on the particulate supporting solid, the crosslinker comprising at least one of boric acid, borax, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate; and
        a crosslinkable polymer comprising at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar;
    placing in the subterranean formation the composition obtained or provided above the subterranean formation comprising the solid-supported crosslinker,
    crosslinking the crosslinkable polymer with the crosslinker, and
    wherein the crosslinker supported on the particulate supporting solid support has a greater or lower reactivity with the crosslinkable polymer than a corresponding crosslinker that is not supported by the supporting solid.

18. A system comprising:
    a composition comprising a solid-supported crosslinker, the solid-supported crosslinker comprising
        a particulate supporting solid that is a sol-gel technique-formed material selected from the group consisting of silica, a borate, magnesium oxide, and a combination thereof, the particulate supporting solid having a particle size of about 0.1 mm to about 20 mm; and
        a crosslinker supported on the particulate supporting solid; and
    a subterranean formation in contact with the composition, wherein the sol-gel technique formed material is formed above the surface of the subterranean formation;
    wherein the composition further comprises a crosslinkable polymer, and
    wherein the crosslinker supported on the particulate supporting solid has a greater or lower reactivity with the crosslinkable polymer than a corresponding crosslinker that is not supported by the supporting solid.

* * * * *